United States Patent
Bailey et al.

(10) Patent No.: US 8,499,179 B2
(45) Date of Patent: Jul. 30, 2013

(54) METHOD AND APPARATUS TO AUTHENTICATE A POWER SUPPLY

(75) Inventors: Douglas John Bailey, Los Gatos, CA (US); Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/490,371

(22) Filed: Jun. 6, 2012

(65) Prior Publication Data

US 2012/0246495 A1 Sep. 27, 2012

Related U.S. Application Data

(63) Continuation of application No. 11/311,957, filed on Dec. 19, 2005, now Pat. No. 8,225,111.

(51) Int. Cl.
*G06F 21/00* (2006.01)

(52) U.S. Cl.
USPC .......................................................... 713/300

(58) Field of Classification Search
USPC .......................................................... 713/300
See application file for complete search history.

(56) References Cited

U.S. PATENT DOCUMENTS

| | | |
|---|---|---|
| 4,737,657 A | 4/1988 | Jatko et al. |
| 5,548,200 A | 8/1996 | Nor et al. |
| 5,592,069 A | 1/1997 | Dias et al. |
| 5,694,024 A | 12/1997 | Dias et al. |
| 5,867,006 A | 2/1999 | Dias et al. |
| 5,960,084 A * | 9/1999 | Angelo .......................... 713/185 |
| 6,018,228 A | 1/2000 | Dias et al. |
| 6,026,126 A * | 2/2000 | Gaetano .......................... 375/296 |
| 6,108,751 A | 8/2000 | Lee et al. |
| 7,296,164 B2 | 11/2007 | Breen et al. |
| 7,392,410 B2 | 6/2008 | Allen et al. |

(Continued)

FOREIGN PATENT DOCUMENTS

| | | |
|---|---|---|
| EP | 0 777 311 A2 | 6/1997 |
| JP | 03-21139 | 1/1991 |

(Continued)

OTHER PUBLICATIONS

"DS2703: SHA-1 Batter Pack Authentication IC," Dallas Semiconductor Corp./Maxim Integrated Products, Inc., Rev. 071805, Jul. 18, 2005 (20 pages).

(Continued)

*Primary Examiner* — Oscar Louie
(74) *Attorney, Agent, or Firm* — Blakely Sokoloff Taylor & Zafman LLP

(57) ABSTRACT

A power bus monitor for use in an electronic product is coupled to receive power from an external power supply. The power bus monitor includes a signal detector coupled to an output of the external power supply to receive and demodulate information encoded on the output of the external power supply into a sequence of bits. A decoder is coupled to receive the sequence of bits from the signal detector and decrypt the sequence of bits. A logical comparator is coupled to receive the sequence of bits decrypted by the decoder. The logical comparator is coupled to assert an authentication signal indicating the external power supply is authorized to provide power to the electronic product when the logical comparator recognizes the sequence of bits decrypted by the decoder as a key.

8 Claims, 5 Drawing Sheets

U.S. PATENT DOCUMENTS

| | | |
|---|---|---|
| 7,506,183 B2 | 3/2009 | Araya |
| 2003/0102842 A1 | 6/2003 | Tamai et al. |
| 2004/0003304 A1 | 1/2004 | Kobayashi |
| 2005/0010782 A1* | 1/2005 | Ohkubo .................. 713/182 |
| 2005/0050325 A1* | 3/2005 | Ohkubo .................. 713/168 |
| 2005/0264772 A1 | 12/2005 | Masukawa |
| 2006/0080051 A1 | 4/2006 | Breen et al. |
| 2006/0085658 A1 | 4/2006 | Allen et al. |
| 2006/0108972 A1 | 5/2006 | Araya |
| 2007/0089163 A1 | 4/2007 | Denton |

FOREIGN PATENT DOCUMENTS

| | | |
|---|---|---|
| JP | 04-308415 | 10/1992 |
| JP | 05-204483 | 8/1993 |
| JP | 07-143749 | 6/1995 |
| JP | 09-308096 | 11/1997 |
| JP | 11-122809 | 4/1999 |
| JP | 2001-069757 | 3/2001 |
| JP | 2005-094128 | 4/2005 |
| WO | WO 96/16462 | 5/1996 |
| WO | WO 00/59127 | 10/2000 |
| WO | WO 01/93398 A2 | 12/2001 |

OTHER PUBLICATIONS

"For Your Customer's Safety, DS2703 Verifies the Origin of Their Batteries," Advertisement for DS2703, Dallas Semiconductor Corp./ Maxim Integrated Products, Inc., retrieved Dec. 2005 (1 pages).

EP 06 254 827.6—European Extended Search Report, dated Apr. 6, 2009 (8 pages).

CN 200610167562.0—Chinese First Office Action with Translation, issued Oct. 8, 2009 (11 pages).

EP 06 254 827.6—European Office Action, dated Jul. 1, 2010 (5 pages).

CN 200610167562.0—Chinese Rejection with English Translation, issued Jan. 12, 2012 (6 pages).

* cited by examiner

METHOD AND APPARATUS TO AUTHENTICATE A POWER SUPPLY

REFERENCE TO PRIOR APPLICATION(S)

This is a continuation of U.S. application Ser. No. 11/311,957, filed Dec. 19, 2005, now pending. U.S. application Ser. No. 11/311,957 is hereby incorporated by reference.

BACKGROUND OF THE INVENTION

1. Field of the Invention

Embodiments of the invention relate generally to electronic products and, more specifically but not exclusively relate to electronic products that receive power from external switching power supplies.

2. Background Information

An external power supply is one that remains outside the enclosure of the product, such as the ac adapter for a digital camera, or the dc adapter that allows the product to operate from a power outlet of an automobile. These electronic products usually are small portable units, but products not designed for portability also use external power supplies. For example, some models of small desktop computers use rather large external power supplies.

Manufacturers of electronic products often prefer to use external power supplies rather than an internal power supply to power their equipment. The use of an external power supply reduces the physical size and weight of the product. Also, the design of the product is not burdened with the need to provide cooling for a power supply if the power supply can simply be procured to the manufacturer's specification as an external component. Typically, the external power supply will connect to the product with a long cable to allow the product to be located at a convenient distance away from the power supply.

Manufacturers desire to prevent the use of unauthorized or counterfeit external power supplies with their products. The use of a power supply that does not meet the manufacturer's requirements can expose the product or the user to harm. Manufacturers may also desire to receive information regarding the operating conditions of the external power supply as for example the power consumption of the external power supply or any fault condition that may exist within the external power supply. The ability to receive information regarding the operating conditions of the power supply is also desirable in the case of internal power supplies incorporated inside products such as desktop computers and set top boxes. Internal power supplies are enclosed within the product itself as in the case of products such as set top boxes or TVs. In some cases, a power supply may be fully contained within its own separate enclosure, but yet enclosed inside the enclosure of the product such as a desktop computer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for authenticating a power supply are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

As will be discussed, novel examples for authenticating a power supply are disclosed herein. In one example, a power supply is authenticated using one-way communication from a power supply to an electronic product with no more than two conductors between the power supply and the electronic product in accordance with the teachings of the present invention. Information is encoded on a power supply output and not on a separate data line. The product decodes the information to identify and/or authenticate the power supply and to respond accordingly. The product may refuse to operate with a power supply that it cannot authenticate. The product may also change its mode of operation in response to information that it receives from the power supply. For example, the product may perform different power management operations depending on the capability of the power supply or in response to a fault condition within the power supply.

Figure 1:
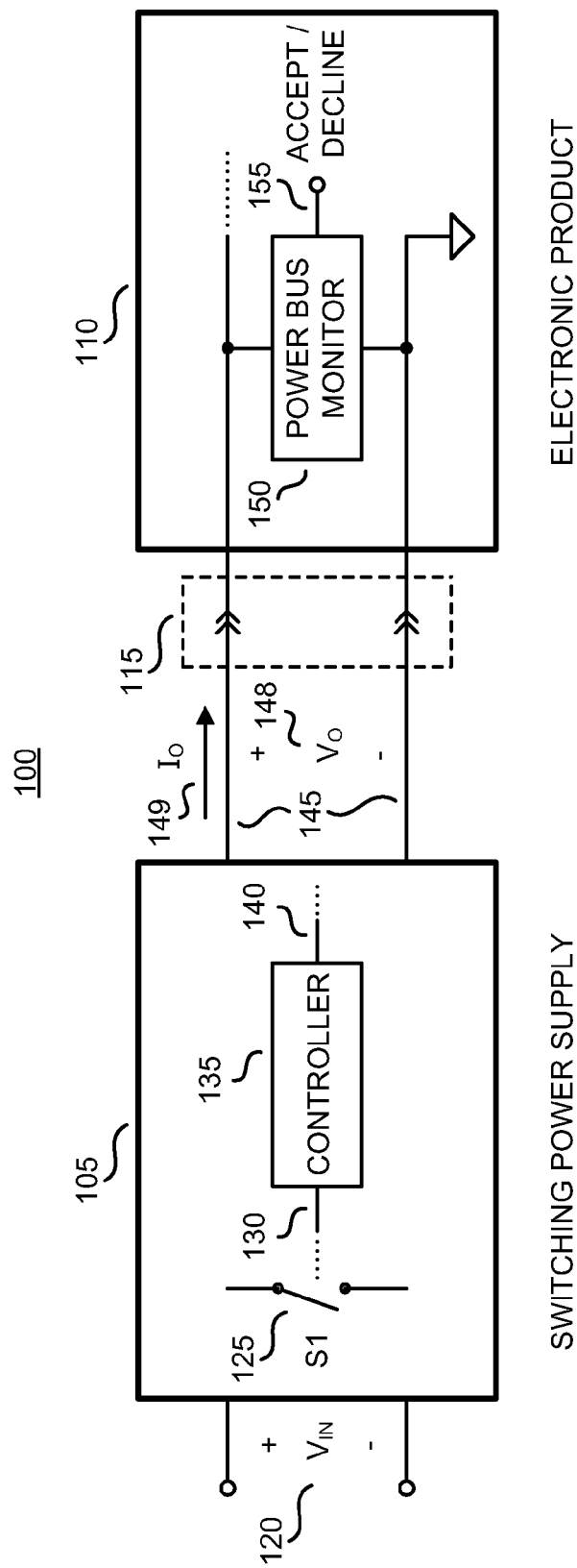
FIG. 1 is a block diagram illustrating an example electronic system with an external power supply in accordance with the teachings of the present invention.

To illustrate, FIG. 1 shows generally an example of an electronic system 100 including an example of an external switching power supply 105 that provides power to an electronic product 110 in accordance with the teachings of the present invention. External switching power supply 105 has an input 120 of voltage VIN and an output 145 of voltage $V_O$ 148 and current $I_O$ 149. External switching power supply 105 includes a switch S1 125 and a controller 135. Controller 135 provides a command signal 130 that switches switch S1 125 in response to an output sense signal 140 to regulate output 145.

Output 145 couples to electronic product 110 through a connector 115. Electronic product 110 contains a power bus monitor 150 that couples to the output 145 of power supply 105 that provides power to electronic product 110 through connector 115. Power bus monitor 150 responds to variations in voltage or variations in current of the output 145 of external switching power supply 105 to produce an authentication signal 155 that indicates whether or not external switching power supply 105 is authorized to provide power to electronic product 110 in accordance with the teachings of the present invention.

Figure 2:
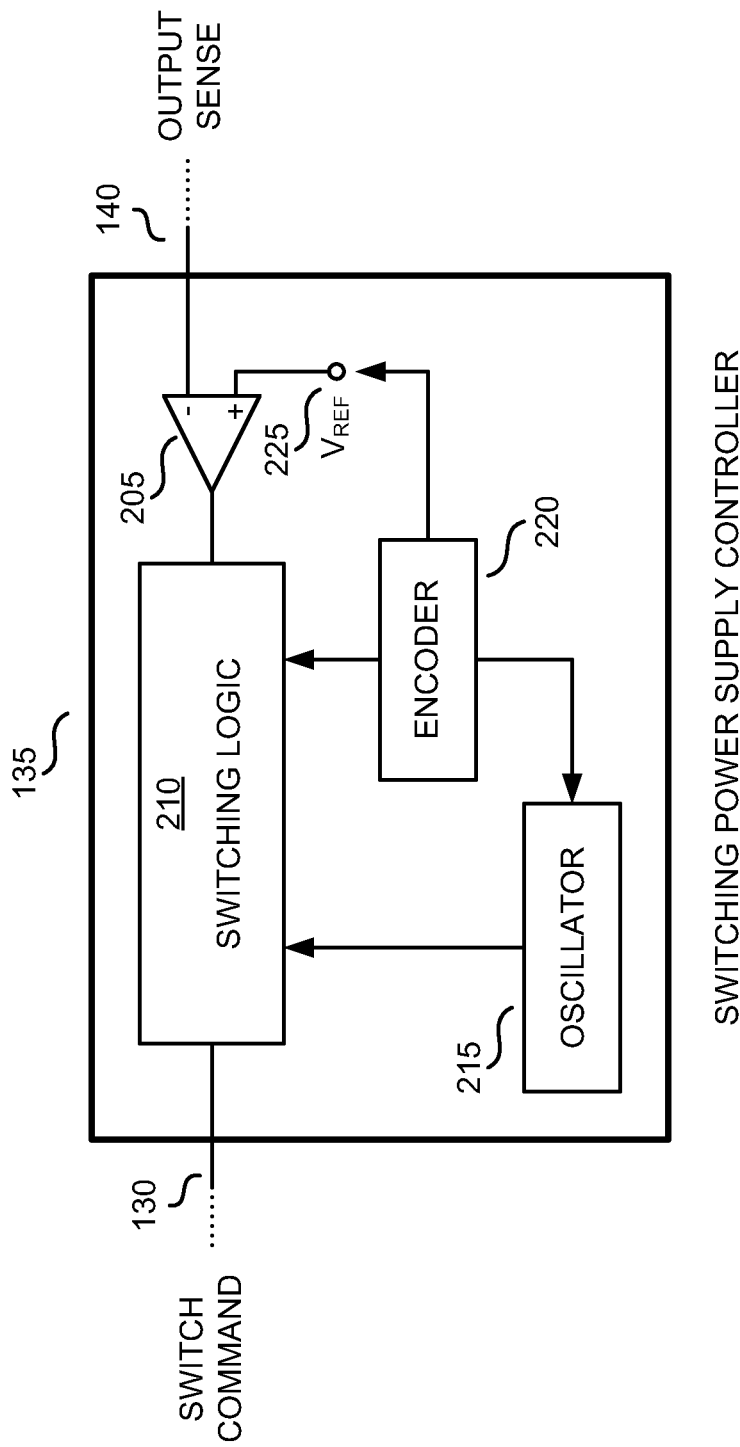
FIG. 2 is a block diagram illustrating an example switching power supply in accordance with the teachings of the present invention.

FIG. 2 shows an example of the switching power supply controller 135 of FIG. 1 in greater detail. As shown, example switching power supply controller 135 contains an oscillator 215, switching logic 210, an encoder 220, and an error amplifier 205 coupled together. Error amplifier 205 receives an output sense signal 140 and a reference signal $V_{REF}$ 225. Switching logic 210 responds to oscillator 215, encoder 220, and error amplifier 205 to produce a switch command signal 130 that switches the switch S1 125 to produce a desired output 145. Encoder 220 may modify the operation of oscillator 215, the value of reference signal 225, and the response of switching logic 220 in a prescribed way to provide information that identifies the power supply to the electronic product in accordance with the teachings of the present invention.

It is appreciated that in the present disclosure, the term "encoding" or "coding" may be interpreted as just the adding of information content to events. Therefore, it is appreciated that the use of the term "encoding" or "coding" as used herein does not necessarily imply the use of encryption to maintain the security or privacy of the information. The information may or may not be encoded with encryption when "encoded" or "coded" in accordance with the teachings of the present invention.

Figure 3:
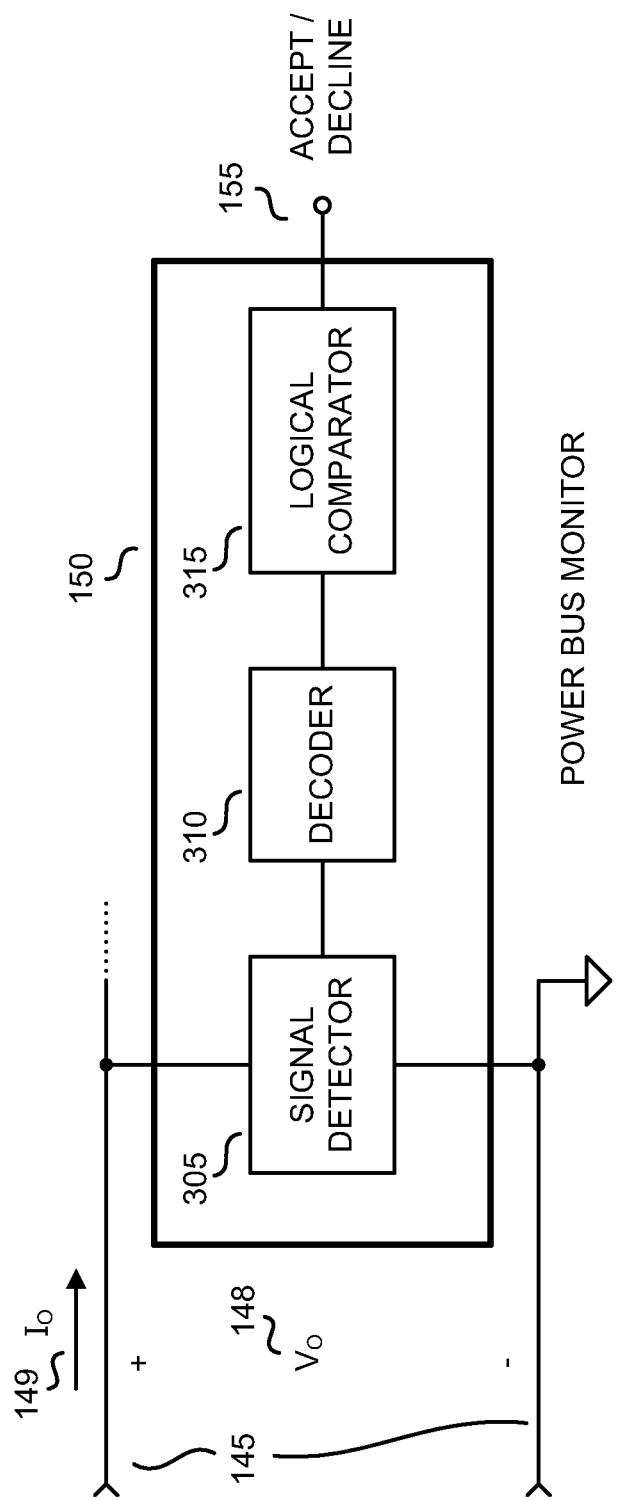
FIG. 3 is a block diagram illustrating an example power bus monitor in accordance with the teachings of the present invention.

FIG. 3 is a block diagram that shows an example of the power bus monitor 150 of FIG. 1 in greater detail. As shown, power bus monitor 150 includes a signal detector 305, a decoder 310, and a logical comparator 315. Signal detector 305 detects patterns of variations in output 145 that are interpreted by decoder 310 and evaluated by logical comparator 315. The nodal connection to the power bus in the example illustrated in FIG. 3 would be used to detect variations in the output voltage 148. It is appreciated that in an alternative example, signal detector 305 could be coupled to detect variations in output current 149. The detected variations in voltage or current could be large such as the presence or absence of a voltage or current, or they could be low amplitude ripples on a much larger dc value of voltage or current. In the illustrated example, logical comparator 315 provides a logic output 155 that indicates whether or not an authorized power supply is providing power to the product in accordance with the teachings of the present invention.

Information may be coded on the output of the switching power supply in several ways. The output of a switching power supply contains a low amplitude ripple component at the switching frequency of switch S1 125. In one example, the switching power supply controller 135 changes the switching frequency in a prescribed pattern to encode information on the output of the power supply while keeping the output within its specified range in accordance with the teachings of the present invention.

In one example, the switching frequency may be modulated to reduce the average switching noise, as in jittering the switching frequency to reduce electromagnetic interference. Modulation of the switching frequency typically does not change the regulated value of the output, and the modulation is detectible only as a variation in the small amplitude ripple and noise that is present in the output. The switching frequency is usually modulated at a constant periodic rate between two values. However, in one example, the frequency is modulated in a pattern that represents binary information to identify the power supply for authentication in accordance with the teachings of the present invention.

Figure 4:
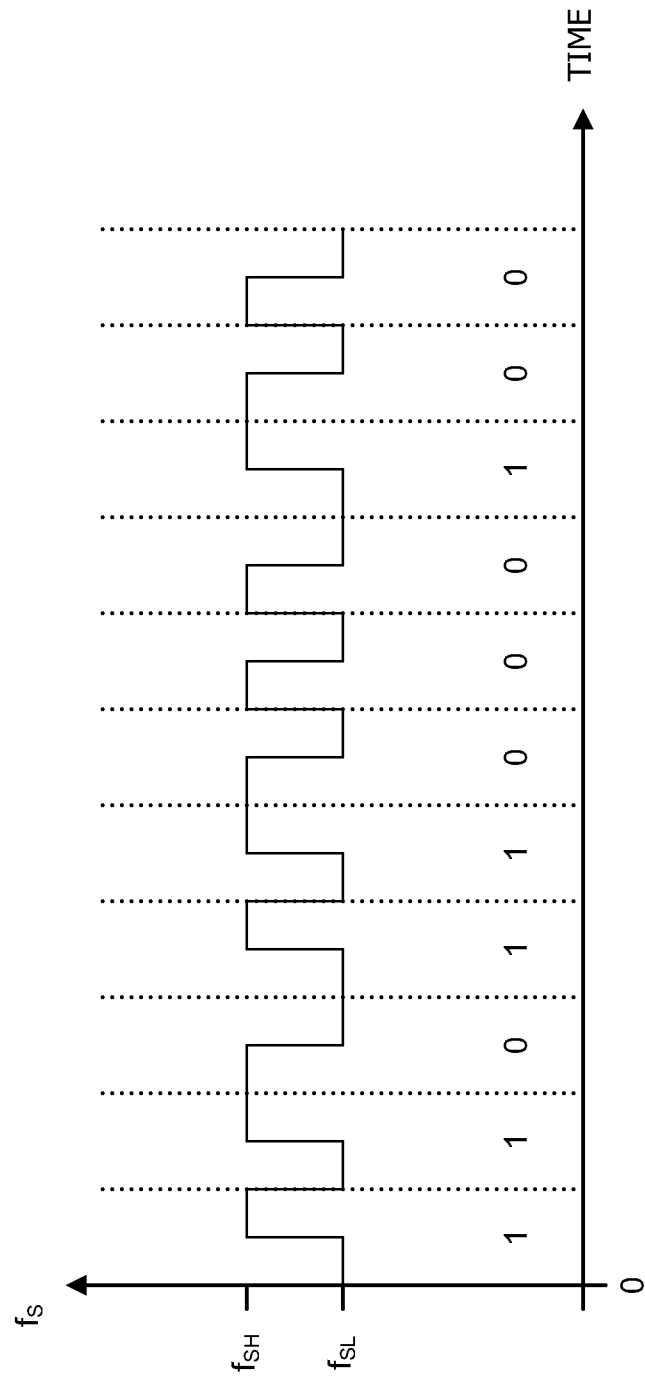
FIG. 4 is a diagram illustrating an example of how a switching frequency can be modulated with encoded information in accordance with the teachings of the present invention.

To illustrate, FIG. 4 shows one example of how the switching frequency of the switch S1 125 of FIG. 1 can be modulated with encoded information in accordance with the teachings of the present invention. In the illustrated example, the switching frequency is shifted between a first frequency $f_{SL}$ and a second frequency $f_{SH}$ in a pattern that represents a sequence of bits. The shift in switching frequency can be gradual or abrupt. The shift of the frequency needs to be only large enough to be detected reliably according to an example of the present invention.

The encoding illustrated in the example of FIG. 4 will be recognized by one skilled in the art as a Manchester encoding. It is appreciated that the Manchester encoding illustrated in FIG. 4 is only one example of a type of encoding and that other types of encoding data may be employed in accordance with the teachings of the present invention. However, the self-clocking property, ease of generation, and zero average value of Manchester encoded signals make Manchester encoded signals one example of encoding that is well suited for encoding binary information on the output of a switching power supply in accordance with the teachings of the present invention. Thus, referring back to FIG. 1, the cable that connects the external power supply 105 to the electronic product 110 needs no more than two conductors in connector 115. In other words, a third conductor for transferring data or synchronization between external power supply 105 and electronic product 110 is not required in accordance with the teachings of the present invention.

Referring now to FIG. 2 for an example, encoder 220 may include a simple linear feedback shift register that uses a polynomial to generate a sequence of bits that encrypts a binary key in accordance with the teachings of the present invention. In use, the manufacturer of the electronic product may specify the polynomial and the key. Modulation of the switching frequency with the desired information can occur intermittently or continuously in accordance with the teachings of the present invention.

Referring now back to FIG. 3, when the switching power supply modulates the switching frequency to encode data on the output of the power supply, signal detector 305 may use any of several well-known frequency demodulation techniques to extract the binary information from the power bus. In one example, decoder 310 includes a linear feedback shift register that uses the same encrypting polynomial and key to decrypt the sequence of bits. When the logical comparator 315 recognizes the key, logical output 155 is asserted to authenticate the power supply in accordance with the teachings of the present invention.

In another example, it is not necessary to modulate the switching frequency to encode information that identifies a power supply for authentication. For instance, the phase of the ripple at the output can be modulated by delaying the switching of the switch by half a switching cycle. In yet another example where the switching frequency does not change, the information can also be encoded in an output quantity of power supply 105, such as for example the amplitude of an output voltage $V_O$ 148 at output 145 or the amplitude of an output current $I_O$ 149 in accordance with the teachings of the present invention.

Figure 5:
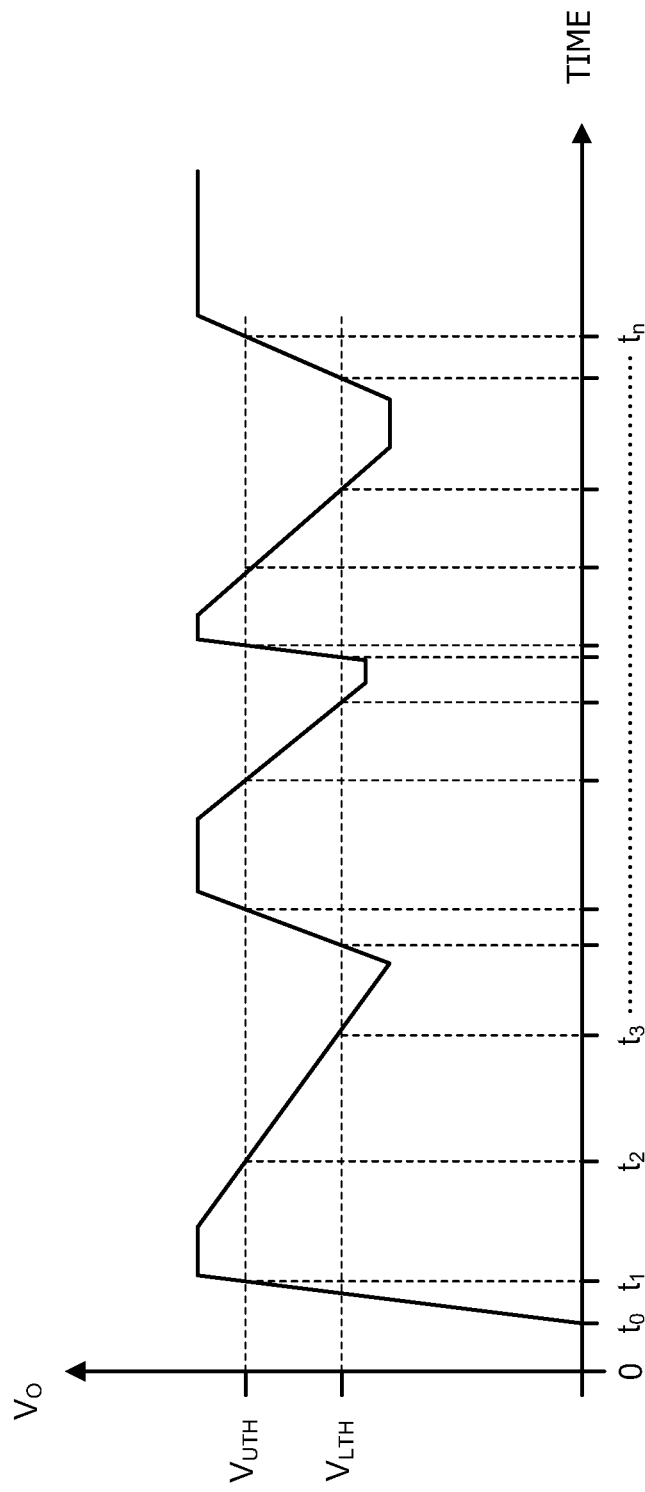
FIG. 5 is a diagram illustrating an example of how an output can be encoded with information to identify a power supply for authentication in accordance with the teachings of the present invention.

To illustrate, FIG. 5 shows one example of how the amplitude of the output voltage $V_O$ 148 of FIG. 1 can be encoded with information to identify a power supply 105 to electronic product 110 for authentication in accordance with the teachings of the present invention. In one example, authentication may occur for example during start-up. In this example of an authentication event during start-up, the output $V_O$ 145 goes through a sequence of changes in amplitude. In one example, a start-up event is the application of alternating current (AC) power to the power supply. In another example, a start-up event is the connection of an output of the power supply to the product. When the authentication is a start-up event, large changes in amplitude typically do not upset the operation of the product 110. Information is encoded at the times that the amplitude crosses thresholds in accordance with the teachings of the present invention. In one example, the duration that an output voltage $V_O$ 148 is above an upper threshold $V_{UTH}$ is compared to the duration the output voltage $V_O$ 148 is below a lower threshold $V_{LTH}$ during an identification event. In one embodiment the lower threshold $V_{LTH}$ is substantially equal to zero volts.

In another example of the present invention, during normal operation, the controller 135 operates using an on/off control scheme where the average frequency at which switch S1 125 switches varies according to the amount of power delivered to the product 110. In this example, the authentication event is an event which takes place when the average frequency at which switch S1 125 switches is within a specific range. While the average switching frequency of S1 of switch S1 125 is within this range, any of the encoding techniques described above can be used such as modulating a magnitude of an output or further modulation of the switching frequency to encode information that can be detected by signal detector 305.

As an example, if the average switching frequency of switch S1 125 is below a threshold value, the encoder 220 of switching power supply controller 135 modulates the reference voltage 225 to modulate the magnitude of the power supply output voltage 140 in accordance with the teachings of the present invention.

As a further example, if the average switching frequency of switch S1 125 is below a threshold value, the encoder 220 of switching power supply controller 135 modulates the oscillator 215 or switching logic 210 to completely disable the switching of switch S1 125 to modulate the magnitude of the power supply output voltage 145 in accordance with the teachings of the present invention.

In a further embodiment of the present invention, during normal operation, the controller 135 receives an output sense signal 140 representative of the output voltage 148. In this embodiment, the authentication event is an event which takes place when the output voltage $V_O$ 148 at output 145 is below a threshold value. While the output voltage is below this threshold value, any of the encoding techniques described above can be used such as modulating a magnitude of an output or modulation of the switching frequency to encode information that can be detected by signal detector 305.

In one example, after signal detector 305 detects an identification event, decoder 310 decodes the sequence and duration of threshold crossings for comparison to a key. In one example, a key is simply the count of a particular number of transitions within a timing window. When logical comparator 315 recognizes the key, logical output 155 is asserted to authenticate the power supply in accordance with the teachings of the present invention.

In addition to simply authenticating an external power supply, any of the above described techniques of encoding and decoding can also be applied to allow the power supply 105 to provide information to the electronic product 110 regarding the operating conditions of the external power supply, for example the power consumption of the external power supply or any fault condition that may exist in the operation of the external power supply. Providing information about the power supply to the electronic product is also desirable when the power supply is internal to the product as for example, in desktop computers, set top boxes, and TVs.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific voltages, currents, frequencies, power range values, times, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A power bus monitor for use in an electronic product coupled to receive power from an external power supply, comprising:
   a signal detector circuit coupled to an output of the external power supply to receive and demodulate information encoded on the output of the external power supply into a sequence of bits;
   a decoder circuit coupled to receive the sequence of bits from the signal detector circuit and decrypt the sequence of bits; and
   a logical comparator circuit coupled to receive the sequence of bits decrypted by the decoder circuit, the logical comparator circuit coupled to assert an authentication signal indicating the external power supply is authorized to provide power to the electronic product when the logical comparator circuit recognizes the sequence of bits decrypted by the decoder circuit as a key, wherein the decoder circuit includes a linear feedback shift register that uses an encrypting polynomial and the key to decrypt the sequence of bits.

2. The power bus monitor of claim 1 wherein the output of the external power supply includes no more than two conductors over which the power from the external power supply are transferred to the electronic product and over which the information encoded on the output of the external power supply is transferred to the signal detector circuit.

3. The power bus monitor of claim 1 wherein the information is encoded on the output of the external power supply by modulating a phase of ripple at the output of the external power supply during start-up.

4. The power bus monitor of claim 1 wherein the information is encoded on the output of the external power supply by modulating an output quantity at the output of the external power supply during start-up.

5. The power bus monitor of claim 4 wherein the output quantity at the output of the external power supply during start-up comprises an output voltage.

6. The power bus monitor of claim 4 wherein the output quantity at the output of the external power supply during start-up comprises an output current.

7. The power bus monitor of claim 4 wherein the information is encoded during start-up at times when an amplitude of the output quantity at the output of the external power supply crosses a threshold.

8. The power bus monitor of claim 4 wherein the authentication signal is generated in response to a comparison of a duration of time that the output quantity is above an upper threshold compared to a duration of time that the output quantity is below a lower threshold.

* * * * *